United States Patent [19]

Hou et al.

[11] Patent Number: 5,573,711
[45] Date of Patent: Nov. 12, 1996

[54] PLANAR FLUORINATED DIELECTRIC SUSPENSIONS FOR ELECTROPHORETIC IMAGE DISPLAYS AND RELATED METHODS

[75] Inventors: Wei-Hsin Hou, Holbrook; Frederic E. Schubert, Shoreham; George Semertzidis, Glen Head, all of N.Y.

[73] Assignee: Copytele, Inc., Huntington Station, N.Y.

[21] Appl. No.: 561,091

[22] Filed: Nov. 21, 1995

Related U.S. Application Data

[63] Continuation of Ser. No. 249,855, May 26, 1994.

[51] Int. Cl.$^6$ .................. H01B 3/22; H01B 3/24
[52] U.S. Cl. .......... 252/572; 252/570; 106/311; 430/32
[58] Field of Search ............ 106/311; 252/570, 252/572; 204/600, 299 R

[56] References Cited

U.S. PATENT DOCUMENTS

| | | | |
|---|---|---|---|
| 3,612,758 | 10/1970 | Evans | 178/5.4 R |
| 4,285,801 | 8/1981 | Chiang | 204/299 R |
| 4,298,448 | 11/1981 | Müller et al. | 204/299 |
| 4,482,465 | 11/1984 | Gray | 252/67 |
| 4,655,897 | 4/1987 | DiSanto | 204/299 R |
| 4,680,103 | 7/1987 | Beilin Solomon I. et al. | 204/299 R |
| 4,732,830 | 3/1988 | DiSanto | 430/20 |
| 5,283,148 | 1/1994 | Rao | 430/114 |

Primary Examiner—Paul Lieberman
Assistant Examiner—Gregory R. Delcotto
Attorney, Agent, or Firm—Plevy & Associates

[57] ABSTRACT

A dielectric suspension for use in an electrophoretic image display, electrostatic printing or the like, comprising a suspension medium including a dense fluorinated solvent and a less dense hydrocarbon solvent, a plurality of pigment particles dispersed in the suspension medium, a fluid dye dissolved in the suspension medium for providing a contrast with the pigment particles, and a charge control agent adsorbed on the pigment particles for preventing the pigment particles from agglomerating.

26 Claims, 2 Drawing Sheets

PLANAR FLUORINATED DIELECTRIC SUSPENSIONS FOR ELECTROPHORETIC IMAGE DISPLAYS AND RELATED METHODS

This is a continuation of application Ser. No. 08/249,855, filed on May 26, 1994, entitled FLUORINATED DIELECTRIC SUSPENSIONS FOR ELECTROPHORETIC IMAGE DISPLAYS AND RELATED METHODS.

RELATED APPLICATIONS

The assignee, Copytele, Inc. is the record owner of U.S. patent application entitled "SUSPENSION FOR USE IN ELECTROPHORETIC IMAGE DISPLAY SYSTEMS", Ser. No. 08/092,749, filed on Jul. 6, 1993 for Frederic E. Schubert and of U.S. patent application entitled "FORMULATIONS FOR IMPROVED ELECTROPHORETIC DISPLAY SUSPENSIONS AND RELATED METHODS", Ser. No. 08/161,315, filed on Dec. 2, 1993 for Frederic E. Schubert.

FIELD OF THE INVENTION

The present invention relates generally to a dielectric fluid suspension for use in electrophoretic image displays, electrostatic printing and the like, and more particularly, to a dielectric fluid suspension composition which includes a fluorinated suspension medium and a method for making the same.

BACKGROUND OF THE INVENTION

The electrophoretic effect is well known and has been the subject of many prior art patents and articles describing the effect. As described and discussed in the prior art, the electrophoretic effect operates on the principle that certain particles, when suspended in a medium, can be electrically charged and thereby caused to migrate through the medium to an electrode of opposite charge. Electrophoretic image displays (EPIDs) implement the electrophoretic effect to produce desired images. In prior art EPIDs, colored particles, which are charged either positively or negatively, are suspended in a dielectric fluid medium that is either clear or of a color which optically contrasts with the particles. The suspension is injected into a cell comprising two parallel screen electrodes, at least one of which is transparent. The colored particles are caused to migrate to, and impinge upon, one of the screen electrodes under the application of an electric field, thereby displacing the fluid medium at that electrode creating the desired image. When the polarity of the field is reversed, the colored particles migrate to the opposite screen electrode.

For suitable examples of such devices using the electrophoretic effect, reference is made to U.S. Pat. No. 4,732,830 entitled ELECTROPHORETIC DISPLAY PANELS AND ASSOCIATED METHODS and issued to Frank J. DiSanto et al. on Mar. 22, 1988. In this patent, there is disclosed an electrophoretic display apparatus which includes a planar transparent member having disposed thereon a plurality of vertically extending, electrically conductive lines defining a grid. A plurality of horizontally extending electrically conductive cathode lines are disposed on top of the vertical lines but are insulated therefrom by a thin insulating layer, thereby forming an XY matrix of electrodes. A conductive plate or anode is spaced above the line pattern and disposed therebetween in an electrophoretic dispersion of yellow submicron pigment particles in a dark colored suspension medium. The particles are transportable within the medium.

As earlier stated, the dielectric suspension consists of submicron particles of a suitable pigment element suspended in a fluid. Each of these particles is encapsulated by means of a charge control and wetting agent which interacts chemically with the particle to enable the particle to acquire an electrical charge. Providing the particles with an electrical charge is important in minimizing particle flocculation when the particles are suspended in the suspension medium and in producing electrophoretic motion.

Up until now, high density chlorinated solvents, such as carbon tetrachloride and tetrachloroethylene and the like, have been used to prepare pigment suspensions for EPIDs and the like. For example, in U.S. Pat. No. 4,655,897 entitled "ELECTROPHORETIC DISPLAY PANELS AND ASSOCIATED METHODS" issued to Frank J. DiSanto et al. on Apr. 7, 1987, tetrachloroethylene is used as a solvent in the preparation of a pigment suspension for EPIDs.

High density chlorinated solvents, in combination with low density solvents, allow density balancing between the EPID liquid medium and the medium's suspended image forming particles. Balancing is important as it allows a uniformly tinted image to be produced over the entire display panel.

In recent years, however, chlorinated solvents have been targeted by regulators because of their potentially harmful environmental effects and toxicity. As a result of this, it is anticipated that the use of chlorinated solvents will be subject to strict restrictions in the future. Hence, the search for alternative solvents, which will replace chlorinated solvents, is of great importance.

Liquids that are completely fluorinated are dense and colorless, and have the tendency to be relatively inert. A combination of a dense fluorinated solvent along with a less dense hydrocarbon liquid, produce a stronger solvent system which is suitable for making dielectric fluid suspensions for EPIDs and similar devices.

It is well known that most fluorinated materials have low surface tension. This characteristic causes fluorinated liquids to be difficult to use in applications involving the wetting of a hydrocarbon substrate, such as, with organic or inorganic pigment surfaces. Thus, agglomerations of pigment particles are difficult to disperse in a fluorinated medium. As such, a stable suspension cannot be formed and the performance of the resulting device is unacceptable.

One method for improving a dispersion's stability is to introduce a surfactant which preferentially adsorbs onto the pigment surface to lower the interfacial tension between the pigment surface and the medium for wetting, and provides a certain electrostatic or steric repulsion for long term stability.

Stabilization of a dielectric suspension depends upon the solubility of the surfactant in the medium and the interaction between the surfactant and the pigment surface. Consequently, selection of the correct surfactant for a particular solvent combination is critical in making a stable dielectric suspension for an EPID or like device.

It is, therefore, an object of the present invention to provide an environmentally acceptable dielectric suspension composition comprising a fluorinated solvent medium which exhibits excellent optical contrast, high electrophoretic speed, long operating lifetime, and good suspension stability in an EPID or other like device.

It is a further object of the present invention to provide a method for making an environmentally acceptable fluorinated dielectric suspension.

SUMMARY OF THE INVENTION

A dielectric suspension for use in an electrophoretic image display, electrostatic printing or the like, comprising a suspension medium including a dense fluorinated solvent and a less dense hydrocarbon solvent, a plurality of pigment particles dispersed in the suspension medium, a fluid dye dissolved in the suspension medium for providing a contrast with the pigment particles, and a surfactant adsorbed on the pigment particles for preventing the pigment particles from agglomerating.

The fluorinated solvent portion of the medium is selected from a group consisting of perfluorotoluene, perfluorocyclohexane, perfluorodimethylcyclohexane, perfluoromethylcyclohexane, perfluoroxylene, perfluorobenzene, perfluorodecalin, perfluorodecane, trifluorotoluene, pentafluorotoluene and low molecular weight liquid polymers having the structure of fluorinated polyethers.

The hydrocarbon solvent portion of the medium is selected from a group consisting of a mixture of phenylxylylethanes, toluene, benzene, xylene, cyclohexane, sec-butylbenzene, phenyloctane, decane, octane, and hexadecane decahydronaphthalene.

In another embodiment of the suspension of the present invention, the medium further includes a second fluorinated solvent selected from a group consisting of perfluorotoluene, perfluorocyclohexane, perfluorodimethylcyclohexane, perfluoromethylcyclohexane, perfluoroxylene, perfluorobenzene, perfluorodecalin, perfluorodecane, trifluorotoluene, pentafluorotoluene and Galden fluids.

In a third embodiment of the suspension of the present invention, the medium further includes a second hydrocarbon solvent selected from a group consisting of a mixture of phenylxylylethanes, toluene, benzene, xylene, cyclohexane, sec-butylbenzene, phenyloctane decane, octane, and hexadecane decahydronaphthalene.

Surfactants of choice for this system are those which are polymeric and have a block which is primarily carbon and hydrogen and a block which is primarily carbon and fluorine. In addition, a functional group to interact with the pigment surface is necessary. The 3M Company fluorad series of surfactants represent examples of materials possessing these characteristics.

A method for making the dielectric suspension of the present invention, comprises the steps of combining a fluorinated solvent and a hydrocarbon solvent to form a suspension medium, adding pigment particles of a first color to the suspension medium, adding a surfactant to the suspension medium to prevent agglomeration of the plurality of pigment particles, dissolving a fluid dye of a second color in the suspension medium and mixing the suspension medium to thoroughly disperse the pigment particles therein.

An alternative embodiment of the method for making the dielectric suspension of the present invention includes combining a second fluorinated solvent with said fluorinated solvent and said hydrocarbon solvent.

A third embodiment of the method for making a dielectric suspension of the present invention, includes combining a second hydrocarbon solvent with said fluorinated solvent and said hydrocarbon solvent.

These and other aspects of the present invention will become apparent from the following detailed description, which discloses several exemplary embodiments of the invention. It is understood that these embodiments are to be used for illustration only, and not as a definition of the limits of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing wherein.

DETAILED DESCRIPTION OF THE INVENTION

Figure 1:
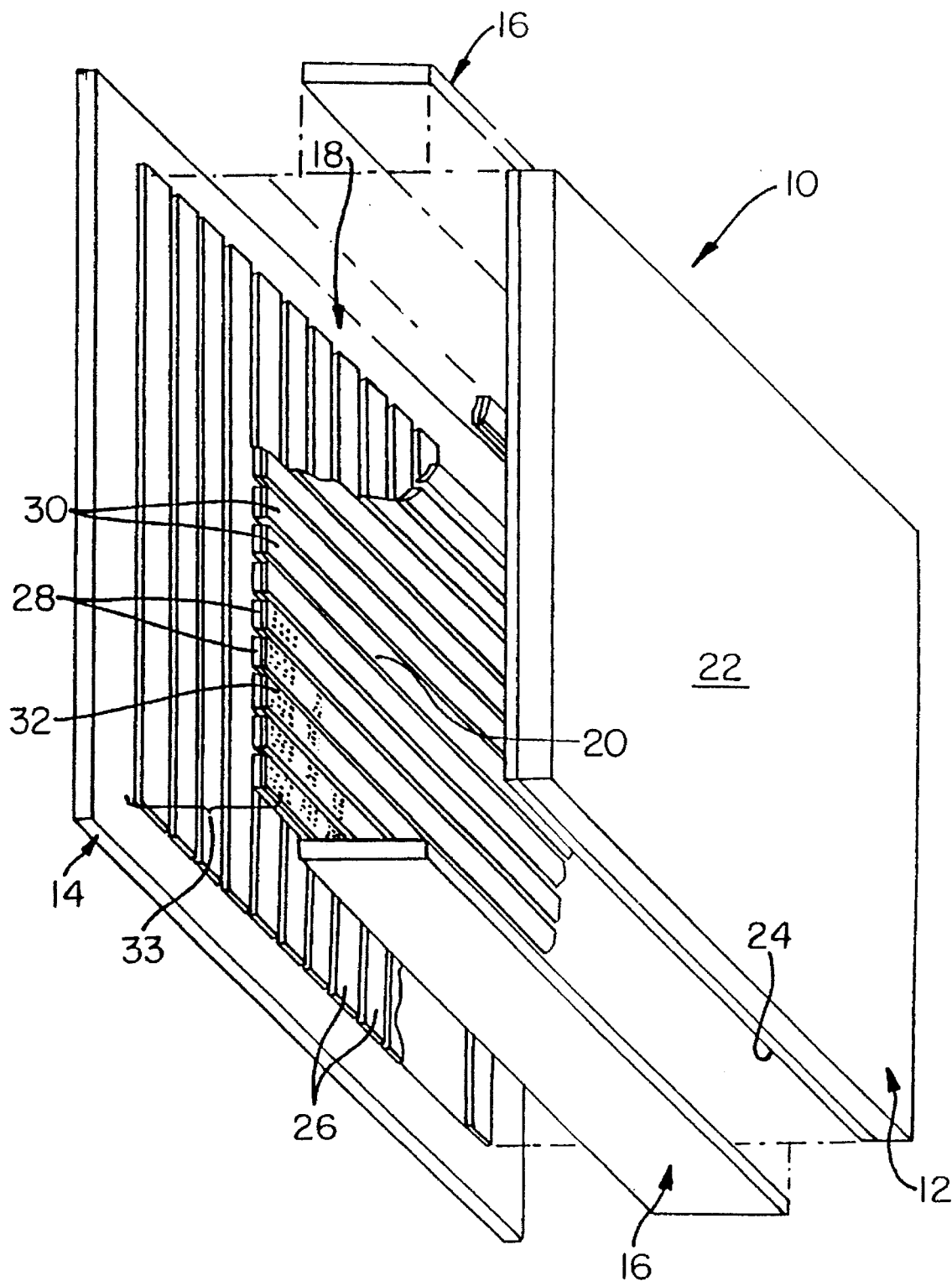
FIG. 1 is a simplified perspective view of an electrophoretic display device with portions partially cut away.

In its broadest aspects, the present invention is directed toward providing a environmentally acceptable fluorinated dielectric suspension composition and a method of manufacturing the same, which provides excellent optical contrast, high electrophoretic speed, long operating lifetime, and good suspension stability. Referring to FIG. 1, there is shown a simplified perspective view of an electrophoretic display device which illustrates one of the many applications for which the dielectic suspension of the present invention was intended for. Apart from the composition of the suspension and the method for making the same, the display 10 can be fabricated in a manner as known in the art. The construction of such displays are well known and reference may be had to the aforementioned U.S. Pat. No. 4,732,830 to DiSanto et al., the disclosure of which is incorporated herein by reference, for details of the same. As shown in FIG. 1, a cell 10 includes a back panel 12, a front panel 14 and side panels 16 to define an enclosed space 18. The enclosed space is bounded by interior surfaces 20, with the cell exterior having exterior surfaces 22.

A layer of conductive material is deposited on an interior side of back panel 12 to serve as the anode 24. Substantially parallel strips 26 of a conductive material are deposited an interior side of front panel 14 to serve as a set of cathodes. Each strip cathode is electrically isolated from adjacent strip cathodes. On top of cathodes 26 is deposited a layer of electrically insulating material 28. On top of layer 28 are deposited substantial parallel strips 30 of conductive material to serve as the control or grid electrodes. Adjacent grid electrodes 30 are also electrically isolated from one another.

The portions of insulator 28 exposed in between the grid electrodes are etched away in a conventional manner to expose small sections of the cathodes between the columns of grid electrodes. When cell 10 is viewed through back panel 12, the grid electrodes 30 overlap cathodes 26 in square or rectangular sections. Within each such section a number of walls 32 are etched into the grid electrodes and into the insulator layer underneath to expose portions of the cathode at the bottom of the wells. Cathodes 26, insulating material 28, and control electrodes 30 form X-Y matrix structure 33.

Back panel 12 is typically composed of glass or transparent plastic. Anode 24 is comprised of an electrically conductive metal or metal oxide, such as a mixture of indium oxide and tin oxide ("ITO") and may be applied to front panel 12 by means such as vacuum sputtering. Front panel 14 is also typically comprised of glass or transparent plastic and is coated with a layer of ITO, which, based on its thickness, is transparent. The cathode strip pattern is etched on the surface of the ITO layer on front panel 14 using conventional etchants as used in the integrated circuit art. The grid electrodes 30 may be comprised of chrome or some other electrically conductive material and may be applied to the insulating material 28 by vacuum sputtering or some other technique. Front panel 14 may extend beyond back panel 12 and carry means thereon (not shown) for conducting voltages to the anodes 24, control electrodes 30, and cathodes 26.

The dielectric suspension 34 is disposed within the enclosed space 18. The liquid typically fills the volume between the front and back panels and side panels of the cell and wells 32. Pigment particles 36 are disposed in the suspension and function as a diffuse reflector when the particles are packed on the cathode. When a sufficient electrical bias is applied between the anode 24 and cathode 26, the electrophoretic particles 36 migrate in response thereto to either the cathode 26 or anode 24 depending on polarity and displace the dark color medium 24 at the viewing surface, thereby creating a white pixel. Reversing the voltage produces a dark pixel.

As previously noted, fluorinated liquids have difficulty wetting organic and inorganic pigment surfaces and require the introduction of a surfactant to lower the interfacial tension between the pigment surface and the medium for wetting. In accordance with the present invention, the suspension composition comprises a yellow pigment, a contrasting blue dye, a fluorosurfactant, and a medium which includes a combination of a dense fluorinated solvent and a less dense hydrocarbon liquid which allows density balancing between the pigment and the medium. An exemplary suspension composition in accordance with the present invention, is depicted below in Table 1.

TABLE 1

| COMPONENT | WEIGHT % |
| --- | --- |
| Perfluorotoluene | 54.42 |
| SAS-40 | 44.25 |
| Yellow Pigment, AAOT | 0.74 |
| Solvent Blue 35 | 0.37 |
| 3M FC-171 | 0.22 |

The exemplary suspension composition of Table 1 comprises, a yellow pigment designated as AAOT yellow, which is supplied by Sun Chemical Company. However, it is understood that other organic pigments such as Darylide yellow, Hansa yellow, Arylide yellow, Hostaperm yellow, Novoperm yellow, and any other suitable organic pigment can be used.

Figure 2:
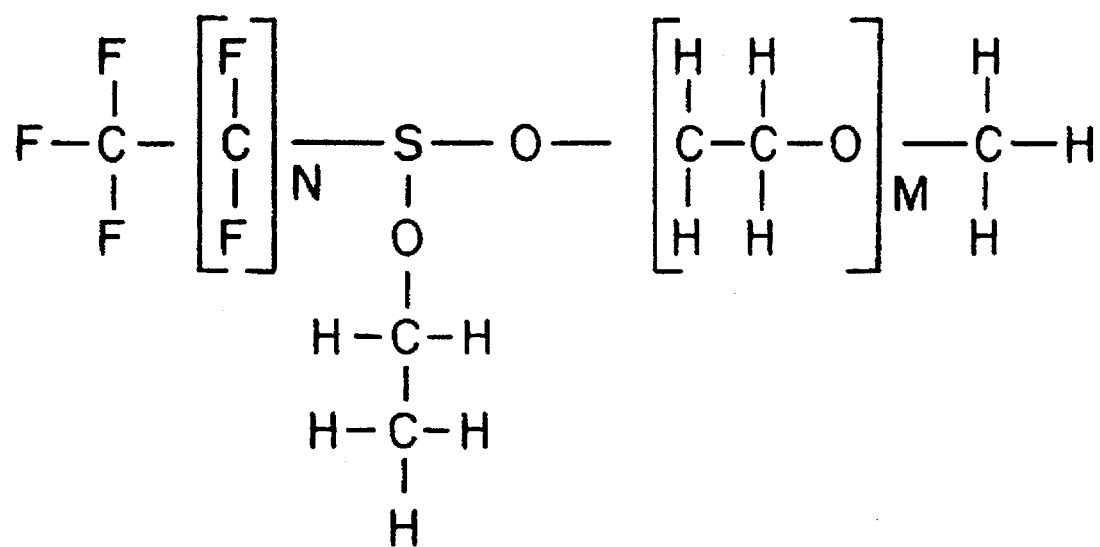
FIG. 2 illustrates the chemical structure of a surfactant.

The charge control agent and stabilizing agent employed in this exemplary suspension composition is a Flourad fluorochemical surfactant from 3M Company. The basic chemical structure of the surfactant is shown in FIG. 2. The indices N and M indicate the number of repeat units for flurocarbon and ethoxy hydrocarbon chains, respectively. Surfactants are available with N and M varying from 3 to 20, allowing a range of choices for varying solvent composition and pigment choice. The exemplary suspension composition employs a surfactant having N and M of between 6 and 9 repeat units of fluorocarbon and ethoxy hydrocarbon chains. Other well known fluorosurfactants may be used including FC-170C, FC-171, FC-176, FC-430, FC-431 and FC-740 from 3M Company and zonyl FSN, FSN-100, FSO, FSO-100, FSC and FSIC from DuPont.

As earlier stated, the medium is comprised of a combination of a dense fluorinated solvent and a less dense hydrocarbon liquid. This combination allows the density to be balanced between the pigment and the medium. Fluoro- and hydrocarbon solvents which are neither strongly acidic or basic in character are preferred because they tend to produce low background conductivity under high electrical field. Perfluorotoluene is the fluorinated solvent used in the exemplary suspension of Table 1. However, well known fluorinated solvents including perfluorocyclohexane, perfluorodimethylcyclohexane, perfluoromethylcyclohexane, perfluoroxylene, perfluorobenzene, perfluorodecalin, perfluorodecane, trifluorotoluene, pentafluorotoluene and low molecular weight liquid polymers having the structure of fluorinated polyethers sold under the trademark GALDEN fluids and manufactured by MONTEDISON USA, INC., and other fluorinated aromatic, cyclic and linear compounds, and the like can be used. The hydrocarbon liquid employed in this exemplary suspension is SAS40 (from Nisseki Co.), which is a mixture of phenylxylylethanes. Other well known suitable hydrocarbon solvents may be used including toluene, benzene, xylene, cyclohexane, sec-butylbenzene, decane, octane, decahydronaphthalene sold under the trademark DECALIN and other neutral aromatic, cyclic or linear compounds.

The concentrations of the pigment, dye and surfactant can be varied in percentage according to the materials employed in the suspension composition as well as the EPID design. In the exemplary suspension composition of Table 1, the pigment concentration is 0.70 to 1.20% by weight, the dye concentration is 0.20 to 0.5% by weight and the surfactant concentration is 0.10 to 0.50% by weight.

The pigment suspension can be prepared using any suitable well known technique. For example, the pigment suspension can be prepared by ball milling all the components with zirconium oxide beads or glass beads preferrably from between 2 and 6 hours. After milling, the suspension is strained from the beads and centrifuged at a speed of preferrably 5000 rpm for 1 to 2 hours. Alternatively, the pigment suspension can be prepared by sonifying all the components in an ultrasonic bath preferrably for 1 to 2 hours.

In an alternative exemplary suspension composition a third solvent is introduced into the suspension compositon. The third solvent is employed to help wet the pigment surface as well as to stabilize the suspension. Additionally, the third solvent can reduce the viscosity of the final suspension which results in an increase in the electrophoretic velocity of the particles.

The third solvent employed above can be a fluorinated solvent or a hydrocarbon liquid, examples of which have been discussed earlier.

The alternative exemplary suspension composition described above in accordance with the present invention, is depicted below in Table 2.

TABLE 2

| COMPONENT | WEIGHT % |
| --- | --- |
| Perfluorotoluene | 34.00 |
| Toluene | 22.50 |
| Perfluoro-dimethylcylohexane | 41.2 |
| Yellow Pigment, AAOT | 1.00 |
| Solvent Blue 35 | 0.10 |
| 3M FC-176 | 1.20 |

In the exemplary suspension composition of Table 2, the pigment concentration is 0.80 to 1.20% by weight, the dye concentration is 0.008 to 0.12% by weight and the surfactant concentration is 1.0 to 1.50% by weight.

Although exemplary compositions including specific concentrations have been set forth above, other suitable components and concentration ranges may be used where desired with similar results. Such variations are intended to be included with the scope of the present invention as defined by the claims.

We claim:

1. A electrophoretic dielectric suspension that is environmentally acceptable and chlorine-free comprising:

a suspension medium including at least one chlorine-free fluorinated solvent and at least one hydrocarbon solvent, said at least one chlorine-free fluorinated solvent comprising approximately 54.42 to 75.20 weight percent of said electrophoretic dielectric suspension and said at least one hydrocarbon solvent comprising approximately 22.50 to 44.25 weight percent of said electrophoretic dielectric suspension;

a plurality of pigment particles dispersed in said suspension medium, said plurality of pigment particles comprising approximately 0.70 to 1.20 weight percent of said suspension medium;

a fluid dye dissolved in said suspension medium for providing a contrast with said pigment particles, said fluid dye comprising approximately 0.008 to 0.50 weight percent of said suspension medium; and a fluorosurfactant absorbed on said pigment particles for preventing said pigment particles from agglomerating, said fluorosurfactant comprising approximately 0.10 to 1.50 weight percent of said suspension medium.

2. The electrophoretic dielectric suspension according to claim 1, wherein said at least one chlorine-free fluorinated solvent is a dense fluorinated solvent.

3. The electrophoretic dielectric suspension according to claim 1, wherein said at least one hydrocarbon solvent is less dense than said at least one chlorine-free fluorinated solvent.

4. The electrophoretic dielectric suspension according to claim 1, wherein said at least one chlorine-free fluorinated solvent is selected from a group consisting of perfluorotoluene, perfluorocyclohexane, perfluorodimethylcyclohexane, perfluoromethylcyclohexane, perfluoroxylene, perfluorobenzene, perfluorodecalin, perfluorodecane, perfluorohexane, perfluorooctane, perfluorodecane, trifluorotoluene, pentafluorotoluene and low molecular weight liquid polymers having the structure of fluorinated polyethers.

5. The electrophoretic dielectric suspension according to claim 1, wherein said hydrocarbon solvent is from a group consisting of a mixture of phenylxylylethanes, toluene, benzene, xylene, cyclohexane, sec-butylbenzene, phenyloctane decane, octane, hexadecane and decahydronaphthalene.

6. The electrophoretic dielectric suspension according to claim 1, wherein said at least one chlorine-free fluorinated solvent comprises two different chlorine-free fluorinated solvents.

7. The electrophoretic dielectric suspension according to claim 1, wherein said at least one hydrocarbon solvent comprises two different hydrocarbon solvents.

8. The electrophoretic dielectric suspension according to claim 1, wherein said fluorosurfactant has the formula

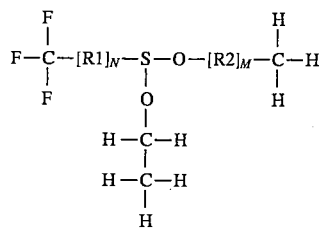

where [R1] is a fluorocarbon and N is the number of repeat units between 3 and 20, and where is an ethoxy hydrocarbon and M is the number or repeat units between 3 and 20.

9. The electrophoretic dielectric suspension according to claim 1, wherein said fluorosurfactant is polymeric containing a block which is primarily carbon and hydrogen and a block which is primarily carbon and fluorine.

10. A process for making a electrophoretic dielectric suspension for an electrophoretic display that is environmentally acceptable and chlorine-free, comprising the steps of:

combining at least one chlorine-free fluorinated solvent with at least one hydrocarbon solvent to form a suspension medium, said at least one chlorine-free fluorinated solvent comprising approximately 54.42 to 75.20 weight percent of said dielectric suspension and said at least one hydrocarbon solvent comprising approximately 22.50 to 44.25 weight percent of said dielectric suspension;

adding a plurality of pigment particles of a first color to said suspension medium, said plurality of pigment particles comprising approximately 0.70 to 1.20 weight percent of said suspension medium;

adding a fluorosurfactant to said suspension medium to prevent agglomeration of said plurality of pigment particles, said fluorosurfactant comprising approximately 0.10 to 1.50 weight percent of said suspension medium;

dissolving a fluid dye of a second color in said suspension medium, said fluid dye comprising approximately 0.008 to 0.50 weight percent of said suspension medium; and mixing said suspension medium to thoroughly disperse said pigment particles therein.

11. The process according to claim 10, wherein said mixing step comprises ball milling.

12. The process according to claim 10, said mixing step comprises sonifying in an ultrasonic bath.

13. The process according to claim 10, wherein said at least one chlorine-free fluorinated solvent is a dense fluorinated solvent.

14. The process according to claim 10, wherein said at least one hydrocarbon solvent is less dense than said at least one chlorine-free fluorinated solvent.

15. The process according to claim 10, wherein said at least one chlorine-free fluorinated solvent is selected from a group consisting of perfluorotoluene, perfluorocyclohexane, perfluorodimethylcyclohexane, perfluoro-methylcyclohexane, perfluoroxylene, perfluorobenzene, perfluorodecalin, perfluorodecane, perfluorohexane, perfluorooctane, perfluorodecane, trifluorotoluene, pentafluorotoluene and low molecular weight liquid polymers having the structure of fluorinated polyethers.

16. The process according to claim 10, wherein said at least one hydrocarbon solvent is from a group consisting of a mixture of phenylxylylethanes, toluene, benzene, xylene, cyclohexane, sec-butylbenzene, phenyloctane, decane, octane, hexadecane, and decahydronaphthalene.

17. The process according to claim 10, wherein said fluorosurfactant has the formula

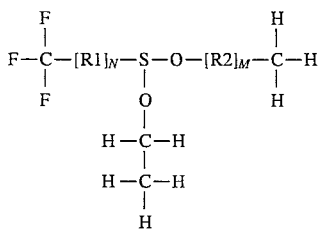

where [R1] is a fluorocarbon and N is the number of repeat units between 3 and 20, and where is an ethoxy hydrocarbon and M is the number or repeat units between 3 and 20.

18. The process according to claim 10 wherein, said fluorosurfactant is polymeric including a block which is primarily carbon and hydrogen and a block which is primarily carbon and fluorine.

19. The process according to claim 10, further comprising the step of centrifuging said suspension to remove unwanted particulate matter.

20. The process according to claim 19, wherein said centrifuging of said suspension at 5000 rpm for between 1 and 2 hours.

21. The process according to claim 10, wherein said at least one chlorine-free fluorinated solvent comprises two different chlorine-free fluorinated solvents.

22. The process according to claim 10, wherein said at least one hydrocarbon solvent comprises two different hydrocarbon solvents.

23. The electrophoretic dielectric suspension according to claim 1, wherein said at least , one chlorine-free fluorinated solvent comprises approximately 54.42 weight percent of said electrophoretic dielectric suspension, said at least one hydrocarbon solvent comprising approximately 44.25 weight percent of said electrophoretic dielectric suspension, said plurality of pigment particles comprising approximately 0.74 weight percent of said suspension medium, said fluid dye comprising approximately 0.37 weight percent of said suspension medium, and said fluorosurfactant comprising approximately 0.22 weight percent of said suspension medium.

24. The electrophoretic dielectric suspension according to claim 1, wherein said at least one chlorine-free fluorinated solvent comprises approximately 75.20 weight percent of said electrophoretic dielectric suspension, said at least one hydrocarbon solvent comprising approximately 22.50 weight percent of said electrophoretic dielectric suspension, said plurality of pigment particles comprising approximately 1.00 weight percent of said suspension medium, said fluid dye comprising approximately 0.10 weight percent of said suspension medium, and said fluorosurfactant comprising approximately 1.20 weight percent of said suspension medium.

25. The process for making a electrophoretic dielectric suspension according to claim 10, wherein said at least one chlorine-free fluorinated solvent comprises approximately 54.42 weight percent of said electrophoretic dielectric suspension, said at least one hydrocarbon solvent comprising approximately 44.25 weight percent of said electrophoretic dielectric suspension, said plurality of pigment particles comprising approximately 0.74 weight percent of said suspension medium, said fluid dye comprising approximately 0.37 weight percent of said suspension medium, and said fluorosurfactant comprising approximately 0.22 weight percent of said suspension medium.

26. The process for making a electrophoretic dielectric suspension according to claim 10, wherein said at least one chlorine-free fluorinated solvent comprises approximately 75.20 weight percent of said electrophoretic dielectric suspension, said at least one hydrocarbon solvent comprising approximately 22.50 weight percent of said electrophoretic dielectric suspension, said plurality of pigment particles comprising approximately 1.00 weight percent of said suspension medium, said fluid dye comprising approximately 0.10 weight percent of said suspension medium, and said fluorosurfactant comprising approximately 1.20 weight percent of said suspension medium.

* * * * *